US010661427B2

(12) United States Patent
Matsushita et al.

(10) Patent No.: US 10,661,427 B2
(45) Date of Patent: May 26, 2020

(54) POWER TOOL

(71) Applicant: Koki Holdings Co., Ltd., Tokyo (JP)

(72) Inventors: Akira Matsushita, Ibaraki (JP); Tomomasa Nishikawa, Ibaraki (JP); Noriyuki Horie, Ibaraki (JP); Masahiro Fujiwara, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 0 days.

(21) Appl. No.: 16/076,326

(22) PCT Filed: Jan. 27, 2017

(86) PCT No.: PCT/JP2017/002953
§ 371 (c)(1),
(2) Date: Aug. 8, 2018

(87) PCT Pub. No.: WO2017/150030
PCT Pub. Date: Sep. 8, 2017

(65) Prior Publication Data

US 2019/0039228 A1 Feb. 7, 2019

(30) Foreign Application Priority Data

Feb. 29, 2016 (JP) ................................ 2016-038316

(51) Int. Cl.
*H02K 9/06* (2006.01)
*B25F 5/00* (2006.01)
*B24B 23/02* (2006.01)

(52) U.S. Cl.
CPC .............. *B25F 5/008* (2013.01); *B24B 23/02* (2013.01); *B24B 23/028* (2013.01); *B25F 5/00* (2013.01)

(58) Field of Classification Search
CPC ......... B24B 23/02; B24B 23/028; B25F 5/00; B25F 5/008
(Continued)

(56) References Cited

U.S. PATENT DOCUMENTS 6,314,922 B1 * 11/2001 Zimmermann ......... B25F 5/008 123/41.56
2004/0263008 A1 * 12/2004 Voigt ...................... B25F 5/008 310/58
(Continued)

FOREIGN PATENT DOCUMENTS

JP S60100107 7/1985
JP 2002-103251 4/2002
(Continued)

OTHER PUBLICATIONS

"International Search Report (Form PCT/ISA/210)" of PCT/JP2017/002953, dated Mar. 21, 2017, with English translation thereof, pp. 1-4.

*Primary Examiner* — Naishadh N Desai
(74) *Attorney, Agent, or Firm* — JCIPRNET

(57) ABSTRACT

A power tool has a fan guide for straightening the flow of cooling air generated by a fan, wherein the branching passages through are provided for causing a portion of the cooling air drawn into the fan from a ventilation hole to diverge from a flow toward an exhaust port formed on a bearing guide side, and the portion of the cooling air flows toward an inlet and thereby circulates inside a housing. The branching passages through provided to the fan guide are formed so as to be inclined in the same direction as a circumferential direction so that air path resistance during actual operation (in an intermediate-speed region) does not increase.

14 Claims, 8 Drawing Sheets

(58) Field of Classification Search
USPC .......................................... 310/50, 52–64, 89
See application file for complete search history.

(56) References Cited

U.S. PATENT DOCUMENTS

| | | | | |
|---|---|---|---|---|
| 2008/0106159 | A1* | 5/2008 | Yoshida | H02K 9/22 310/50 |
| 2010/0038979 | A1* | 2/2010 | Miller | B23D 53/12 310/50 |
| 2012/0302147 | A1* | 11/2012 | Trautner | B24B 23/028 451/488 |
| 2014/0331508 | A1 | 11/2014 | Simm | |
| 2016/0193727 | A1* | 7/2016 | Takeda | B24B 23/028 173/46 |

FOREIGN PATENT DOCUMENTS

| | | |
|---|---|---|
| JP | 2006-315121 | 11/2006 |
| JP | 2010-173042 | 8/2010 |
| JP | 2015-047668 | 3/2015 |

* cited by examiner

POWER TOOL

CROSS-REFERENCE TO RELATED APPLICATION

This application is a 371 application of the International PCT application serial no. PCT/JP2017/002953, filed on Jan. 27, 2017, which claims the priority benefit of Japan application no. 2016-038316, filed on Feb. 29, 2016. The entirety of each of the above-mentioned patent applications is hereby incorporated by reference herein and made a part of this specification.

BACKGROUND OF THE INVENTION

1. Field of the Invention

The present invention relates to a power tool having a fan for cooling, in particular to the power tool which improves a fan guide of a fan attached to a rotation axis of a driving means and thereby suppresses the over speed of a driving source such as a motor.

2. Description of Related Art

A disk grinder as set forth in patent literature 1 is known as an example of a portable power tool. The disk grinder has a cylinder-shaped motor housing accommodating a motor which is a driving source. In front of the motor housing, a power transmission mechanism, which is configured to include two sets of bevel gears that change a power transmission direction determined by a rotation axis of the motor for about 90°, is arranged. The power transmission mechanism is accommodated in a gear case, and a grinding stone is attached to a spindle which protrudes downward from the gear case. A fan for cooling is arranged on a front end side of the rotation axis of the motor, and a ventilation port introducing an external air and an exhaust port for discharging an internal air are arranged on the housing. The cooling air flows from the ventilation port to the exhaust port due to the rotation of the fan and cools the heat-generating motor.

LITERATURE OF PRIOR ART

Patent Literature

Patent literature 1: Japanese Laid-open No. 2010-173042

SUMMARY OF THE INVENTION

Problems to be Solved by the Invention

In recent years, out of a requirement to increase operation efficiency of an operator, output of a motor of a power tool is increased, downsizing and lightening and low cost are required, and the applicant realizes various power tools accompanying this change. In a case of merely increasing the output of the motor, it is considered to raise the speed of the motor during operation, but in this case, the speed during idling when a work machine is not pressed against an object becomes high, and the noise corresponding to the exhaust amount of a fan and so on becomes loud. For conventional power tools, the noise is solved by limiting the speed during idling by using an expensive controller, but the product cost increases in accordance with the arrangement of the controller or the arrangement of a detection element detecting the speed of the motor and so on.

The present invention is achieved in view of the aforementioned background, and aims to provide a power tool which is capable of controlling the speed of a motor during idling with simple structure. Another objective of the present invention is to provide a power tool which can use an air flow generated by a fan to suppress an increase in the speed of a motor during idling.

Means to Solve the Problems

The characteristics of the typical invention disclosed in this application are as described below. According to one characteristic of the present invention, a power tool is configured to comprise: a fan, which is rotated by a motor; a housing, which accommodates the motor and the fan; and a fan guide, which straightens the flow of cooling air generated by the fan, wherein ventilation ports introducing an external air and exhaust ports discharging an internal air are arranged on the housing, and an air path of the cooling air is formed from the ventilation ports to the exhaust ports by the rotation of the fan, a branching passage for diverging a portion of the cooling air drawn by the fan and discharging it to a drawing side is arranged, and a portion of the cooling air circulates inside the housing instead of being discharged from the exhaust port owing to the branching passage.

According to another characteristic of the present invention, a portion of the cooling air guided by the fan guide toward the exhaust port is drawn back to an air path before entering the fan guide owing to the branching passage. Because the diverging of the cooling air is performed using the fan guide, the present invention can be easily realized using an improved fan guide only. The fan guide is substantially cup-shaped with an opening on the exhaust side or substantially cylinder-shaped with a narrowing inlet side, and an opening part which becomes the exhaust port side is covered by a cover component having exhaust holes. A ventilation hole for passing the air flowing into the fan and through holes forming the branching passages are formed in the fan guide. In this case, a total opening area of the through holes is preferable configured to be smaller than a total opening area of the exhaust holes formed in the cover component.

According to another characteristic of the present invention, a power transmission mechanism for the power machine is arranged on a front end of the rotation axis of the motor, the fan is fixed between a stator and the power transmission mechanism in the rotation axis, and the fan guide is arranged between the fan and the stator. The fan guide has a motor side wall surface which is substantially perpendicular to the axis direction, and the ventilation hole is arranged in the vicinity of the center of the motor side wall surface. The through holes of the fan guide are arranged on the outer circumference side of the ventilation hole in the motor side wall surface. The cover component is arranged between the fan and the power transmission mechanism side, and has a wall surface which is perpendicular to the axis direction.

According to another characteristic of the present invention, the fan guide is integrally molded so as to be disposed while extending from an outer edge part of the motor side wall surface toward the cover component and covering an outer circumference side of the centrifugal fan, and the through holes are arranged in a circumferential direction in several positions of the outer circumference side of the motor side wall surface with a distance between each other. The shape of the through holes are formed to be inclined so that the cooling air is made to flow out to the air path before entering the fan guide while being guided to the spinning direction of the motor, that is, the air is guided toward the rotation direction to the stator side of the motor in the axis direction. Here, an air volume flowing out of the through holes is preferably below 20% of the air volume flowing out of the exhaust holes.

Effect of the Invention

According to the present invention, the power tool which is capable of suppressing the exhaust amount with a simple structure that merely improves the shape of the fan guide can be realized. The aforementioned and other objectives and new characteristics of the present invention are made clear from the description of the specification and the drawings below.

DESCRIPTION OF THE EMBODIMENTS

Embodiment 1

Figure 1:
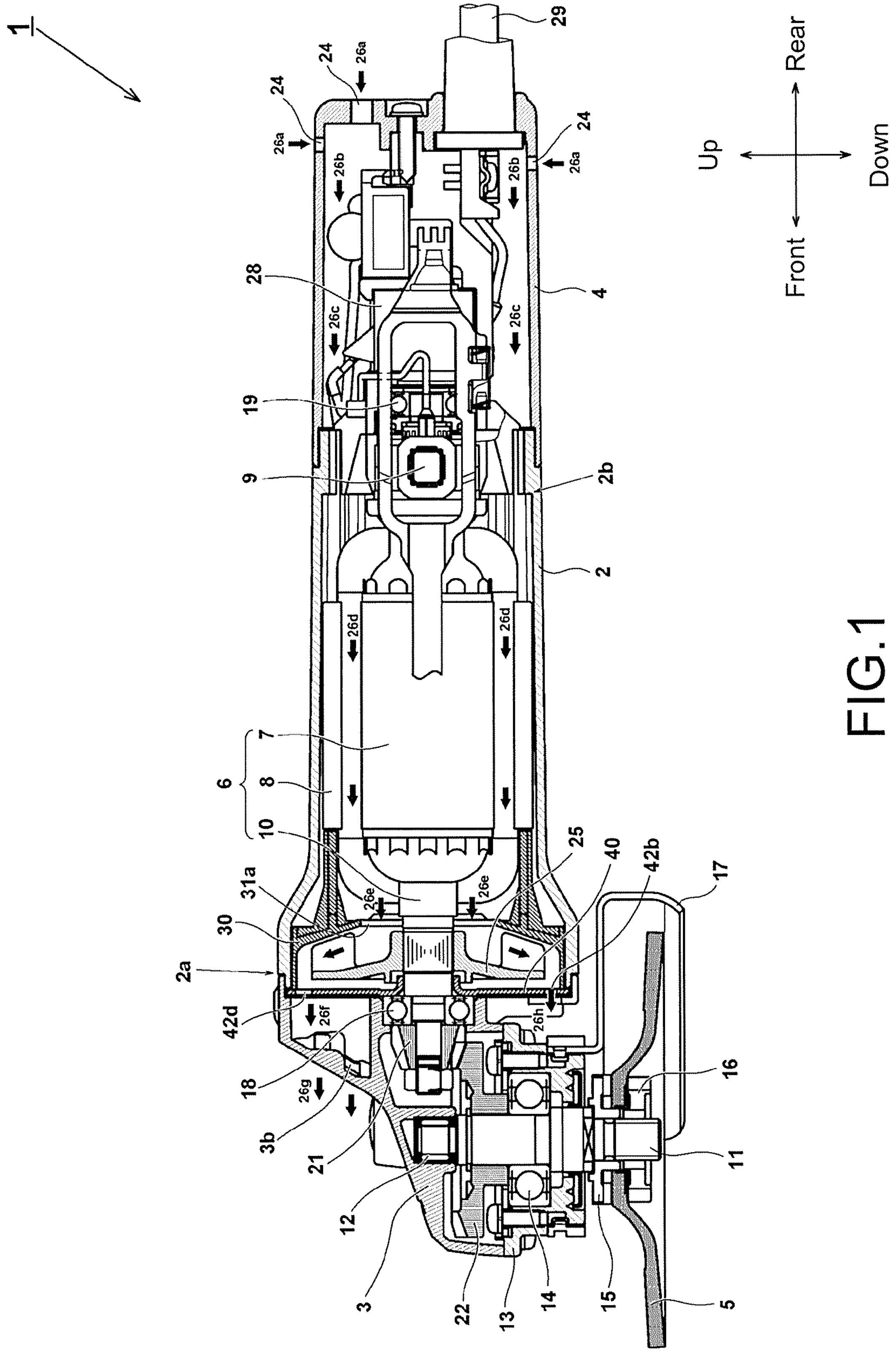
FIG. 1 is a vertical cross-section view showing an overall structure of a disk grinder 1 of an embodiment of the present invention.

In the following part, the embodiment of the present invention is described with reference to the drawings. In the following drawings, a disk grinder 1 is used as an example of a power tool for description, the same symbols are marked for the same part and repeated description is omitted. Besides, in this specification, directions of front, back, left, right, up and down are described as the directions shown in the drawings.

FIG. 1 is a cross-section view showing an overall structure of the disk grinder 1 of an embodiment of the present invention. A housing of the disk grinder 1 comprises three main parts: a cylinder-shaped motor housing 2, which accommodates a motor 6 inside; a tail cover 4, which is mounted back of the motor housing 2; and a gear case 3, which is mounted in front of the motor housing 2. The gear case 3 is a case made of metal accommodating a power transmission mechanism which transmits power from the motor 6 to a spindle 11, accommodates two sets of bevel gears 21, 22 which change a power transmission direction determined by a rotation axis 10 of the motor 6 for about 90°, and pivotally supports the spindle 11.

The motor 6 in this embodiment uses a universal motor which operates with an alternative current. The motor 6 has a stator 8 on an outer circumference side of a rotor 7. A brush holding part 9 is arranged on a rear side of the motor 6. The motor housing 2 is fabricated to a cylinder shape or a long tube shape by the integral molding of a polymer resin such as polycarbonate, and the stator 8 is fixed by the motor housing 2 so as not to rotate in the circumferential direction. Besides, a step part 2*b* with a shortened internal diameter is formed on a rear side of the motor housing 2, and the motor 6 is inserted from an opening 2*a* in the front of the motor housing 2 to the rear side. The movement of the motor 6 in the axis direction is suppressed by a fan guide 30 in the front side. In addition, the type of shape of the motor 6 are not limited to those in this embodiment, and other types of motors such as a direct-current motor or a brushless DC motor can also be used.

A rotation axis 10 of the motor 6 is rotatably held by a bearing 18 fixed to the gear case 3 and a bearing 19 disposed on the rear side of the brush holding part 9. A fan 25 for cooling is arranged on the front side of the rotation axis 10 of the motor 6. The fan 25 is, for example, a centrifugal fan made of synthetic resin by integral molding, and is fixed to the rotation axis 10 so as to rotate synchronously with the rotation axis 10. The fan 25 rotates due to the rotation of the motor 6, thereby introducing an external air from a ventilation port 24 arranged on a rear part of the tail cover 4 as shown by an arrow 26*a*, and generating an air flow which passes through the tail cover 4 as shown by an arrow 26*b* and an arrow 26*c* and passes the motor 6 part as shown by an arrow 26*d*. The air flow passing through the motor 6 flows into a fan chamber from a ventilation hole 31*a* formed in the central part of the fan guide 30 as shown by an arrow 26*e*, flows outward in the radial direction, passes through an exhaust hole 42*d* formed in a bearing holder 40, enters the inner space of the gear case 3 as shown by an arrow 26*f*, and is discharged forward from an exhaust port 3*b* formed in the gear case 3 as shown by an arrow 26*g*. On the other hand, the air flowing into the fan chamber passes through an exhaust hole 42*b* formed under the bearing holder 40 from the arrow 26*e* below, flows as shown by an arrow 26*h* and is discharged outside.

The tail cover 4 is separated into a right tail cover and a left tail cover, and the right and left of the tail cover 4 is secured to the motor housing 2 by a screw that is not shown. A power supply cord 29 for supplying electric power to the motor 6 is connected to the exterior of the tail cover 4. A switch 28 for turning the motor 6 ON/OFF is accommodated inside the tail cover 4.

The gear case 3 is mounted to the motor housing 2 by four screws (not shown) which are inserted from the front to the back. Inside the gear case 3, the spindle 11 is disposed so that the axis center extends in the up and down direction, the upper end is fixed to the gear case 3 by a bearing metal 12, and is pivotally support near the center to a bearing 14 by a spindle cover 13. A wheel washer 15 is arranged at the lower end of the spindle 11, and is mounted so that a grinding stone 5 is clamped by the wheel washer 15 and a wheel nut 16. A large-diameter bevel gear 22 is arranged above the bearing 14 of the spindle 11, and the bevel gear 22 engages with a small-diameter bevel gear 21 arranged at the front end of the rotation axis 10 of the motor 6, thereby decelerating the rotation of the motor 6 with a predetermined ratio and rotating the grinding stone 5.

The grinding stone 5 can be attached to or removed from the spindle 11 by the wheel nut 16. The grinding stone 5 is, for example, a resinoid flexible grinding stone, a flexible grinding stone, a resinoid grinding stone or a sanding disk with a diameter of 100 mm, and a surface grinding or a sphere grinding for metal, synthetic resin, marble, concrete and so on may be performed according to the choice of the type of abrasive grains that are used. The maximum permissible speed of the grinding stone 5 is 12000 rpm for example, and the speed during operation is sufficiently lower than the maximum permissible speed. A wheel guard 17 is used to prevent scatter of the ground components or damaged abrasive grains.

Figure 2:
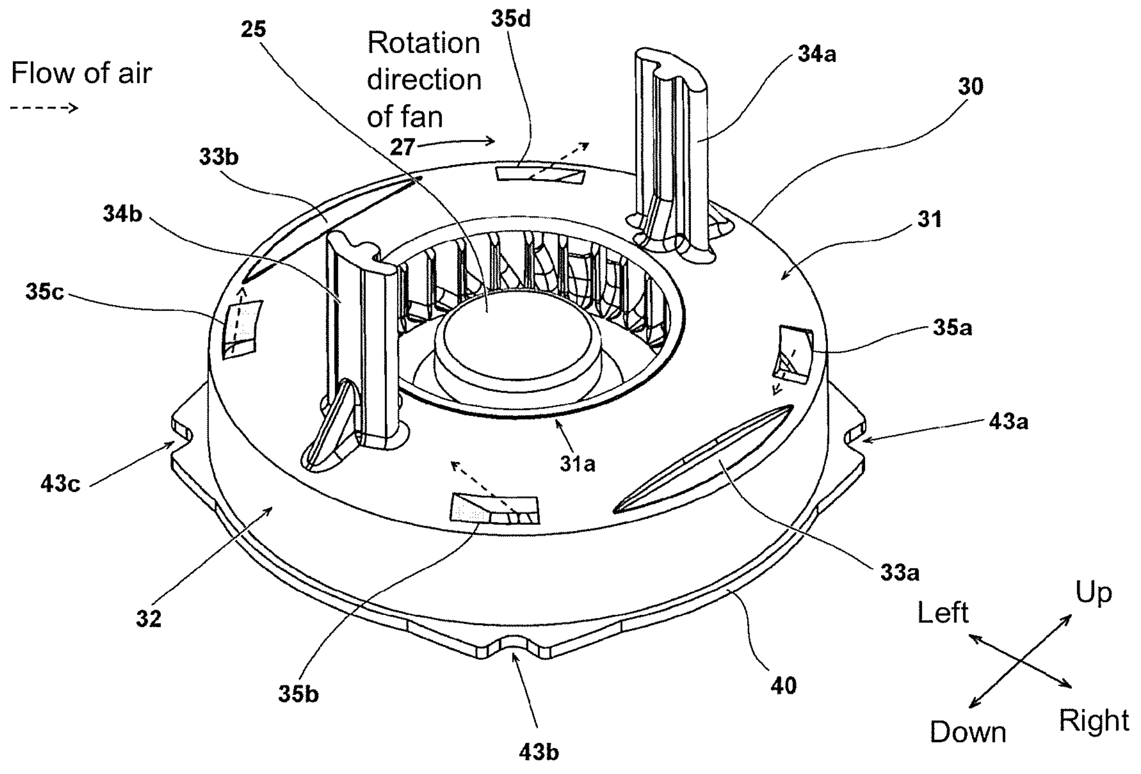
FIG. 2 is a perspective view seen from the diagonal back of an assembly of a fan guide 30 and a bearing holder 40 in FIG. 1.

FIG. 2 is a perspective view seen from the diagonal back of an assembly of the fan guide 30 and the bearing holder 40 in FIG. 1. The fan guide 30 is a substantially cup-shaped air-straightening component fabricated by integral molding of the synthetic resin, and at the center of a rear wall surface 31 which becomes a bottom surface of the cup, the ventilation hole 31*a* of the air drawn by the fan 25 is formed. The substantially ring-shaped rear wall surface 31 which becomes the wall surface on the motor 6 side and a cylinder-shaped external wall surface 32 are formed, wherein the external wall surface 32 is connected to the outer edge part of the rear wall surface 31, and extends toward the front side (discharge side) in the axis direction so as to maintain a predetermined distance with the fan 25 on the outer side of the fan 25 in the radial direction. The front side of the external wall surface 32 becomes a large circular opening, and a fan chamber where the fan 25 rotates is formed by the way of covering the opening by the plate-shaped bearing holder 40. The fan guide 30 is inserted to the front side of the motor 6 from the opening 2*a* (see FIG. 1) of the motor housing 2, and is fixed by screwing the gear case 3 to the motor housing 2 by four screws (not shown) so that the bearing holder 40 is disposed in front of the fan guide 30 and is clamped. In this case, the fan guide 30 also functions as a holding component which prevents the movement of the stator 8 of the motor 6 in the axis direction and holds the motor 6 while prevents the rotation of the stator 8 in the rotation direction; for this reason, stator pressers 34*a*, 34*b* which extends in the axis direction and contacts with the end of the stator 8 are formed.

In two opposing positions on the outer circumference side of the rear wall surface 31 of the fan guide 30, dents 33*a*, 33*b* which dent forward from the rear wall surface 31 are formed. The dents 33*a*, 33*b* are formed to prevent wires wound on the stator 8 from contacting with the rear wall surface 31 of the fan guide 30. In four positions near the outer circumference of the rear wall surface 31, branching passages 35*a* through 35*d* which become through holes for diverging a portion of the air generated by the fan 25 and turning the air to flow back to the motor 6 side are formed. Most of the air flowing into the fan guide 30 via the ventilation hole 31*a* is drawn by the fan 25 rotating in an arrow direction showing a rotation direction 27 of the fan 25, then is guided to the outer circumference side by a centrifugal force and flows to the gear case 3 side via exhaust holes (described below by FIG. 5) formed on the outer circumference side of the bearing holder 40.

On the other hand, a portion of the air flowing into the fan guide 30 via the ventilation hole 31*a* is discharged from the fan chamber to the rear side (the motor 6 side) through branching passages 35*a* through 35*d* as shown by a dotted-line arrow. The shape of the branching passages 35*a* through 35*d* are determined so that the cooling air is discharged aslant in the circumferential direction with respect to the rotation direction 27 of the fan 25, and slant surfaces 37*a* through 37*d* (described below by FIG. 3) which become the wall surface in the circumferential direction of the branching passages 35*a* through 35*d* when seen from behind are formed. In this way, the branching passages 35*a* through 35*d* flow the cooling air with a shallow angle with respect to a tangent line of the rotation direction, therefore can guide the cooling air in the spinning direction of the motor 6 while discharges the cooling air to the air path before entering the fan guide 30. In this case, the direction of the cooling air discharged backward through the branching passages 35*a* through 35*d* is opposite to the air flow which flow into the fan chamber, therefore becomes a resistance to the air flow 26*e* and a turbulent flow is generated. When the turbulent flow is generated, the flow channel resistance increases, so that the workload of the fan 25 increases, the load to the motor 6 increases and the speed is suppressed. On the other hand, during low-speed rotation, the amount of the air flowing from the branching passages 35*a* through 35*d* to the motor 6 side decreases, so that the influence of the turbulent flow to the motor 6 decreases. In this way, the branching passages 35*a* through 35*d* acts as counter-flow channels inside the motor housing 2 and generates a turbulent flow. Besides, because the branching passages 35*a* through 35*d* are arranged with equal intervals in several positions in the circumferential direction, stress will not concentrate on a specific part of the fan guide 30.

Figure 3:
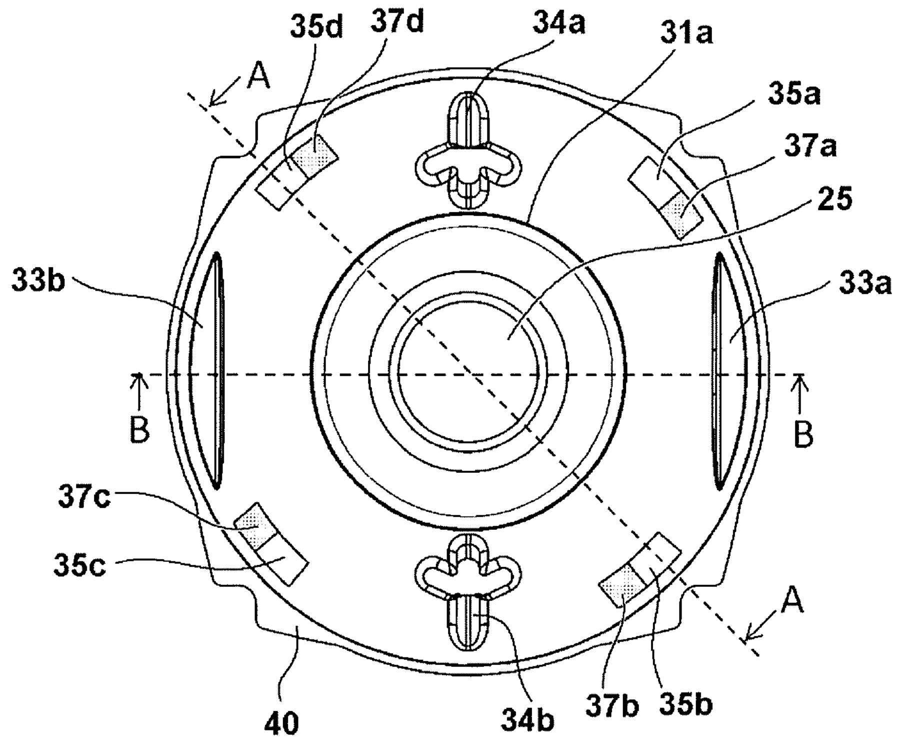
FIG. 3 is a back view of the assembly of the fan guide 30 and the bearing holder 40 in FIG. 2.

FIG. 3 is a back view of the assembly of the fan guide 30 and the bearing holder 40 in FIG. 2. The fan guide 30 is fabricated by the integral molding of a synthetic resin such as plastic, therefore the fan guide 30 is lightweight, flexibility in shape is high, and an increase in manufacturing cost can be suppressed. In the bearing holder 40, dents 43*a* through 43*d* for passing the screws which secure the gear case 3 to the motor housing 2 are formed in four corners. In addition, through holes through which the screws pass may be formed instead of the dents 43*a*-43*d*. Side surfaces on the inner circumference side and outer circumference side of the branching passages 35*a* through 35*d* are concentrically formed so as to be parallel to the axis direction of the rotation axis 10 of the motor 6. A portion of the branching passages 35*a* through 35*d* are formed so as to be parallel to the rotation direction of the fan 25, and in other portion of the branching passages 35*a* through 35*d*, slant surfaces 37*a* through 37*d* which are inclined to the circumferential direction (the rotation direction of the fan 25) instead of being perpendicular are formed and become rear slant surfaces 36*a* through 36*d* (see FIG. 4 below). Accordingly, in this embodiment, the outer circumference surface and the rear side of the fan 25 is covered by the fan guide 30, and a portion of the plurality of branching passages 35*a* through 35*d* is formed aslant with respect to the rotation direction of the fan 25 in a portion of the rear wall surface 31. As a result, the cooling air moving in the rotation direction of the fan 25 moves along a slant shape, so that a portion of the cooling air is circulated (flow back) smoothly inside the motor housing 2 from the fan chamber side to a space on the motor 6 side.

Figure 4:
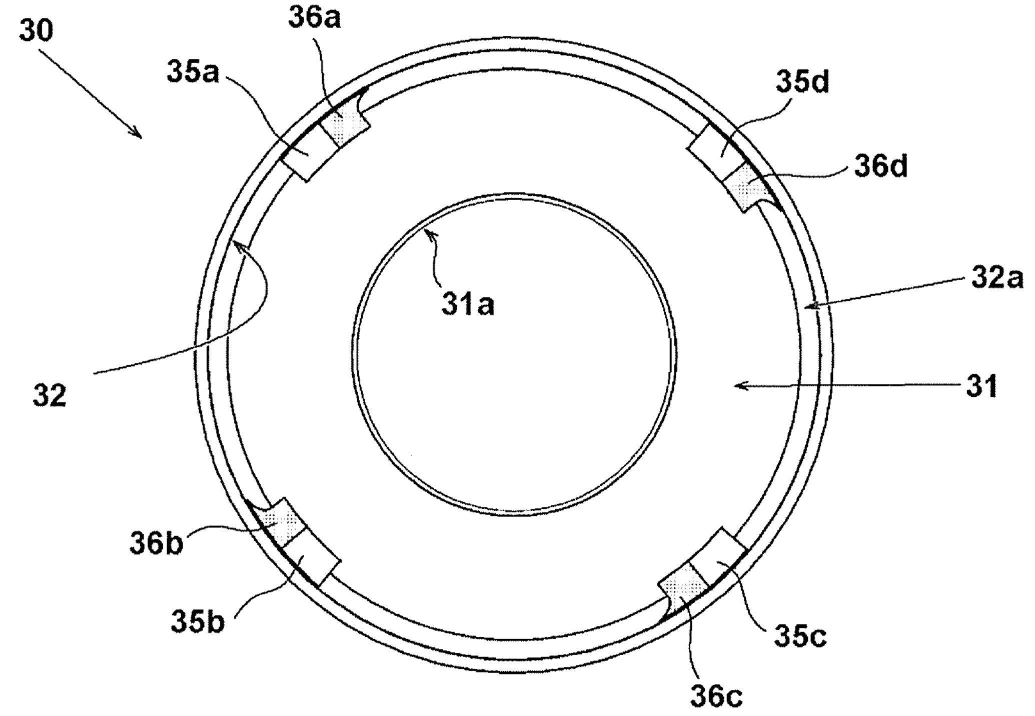
FIG. 4 is a front view of only the fan guide 30 in FIG. 2.

FIG. 4 is a front view of only the fan guide 30, and shows a shape obtained by observing a space (fan chamber) where the fan 25 is accommodated from the front side. Here, the wall surfaces of the branching passages 35*a* through 35*d* on the circumferential direction side (the rear side on the rotation direction of the fan 25) are formed to a slant slope shape as 36*a* through 36*d*, and the circulating air flowing in the dotted-line arrow direction shown in FIG. 2 is guided to the space on the motor 6 side. The branching passages 35*a* through 35*d* are formed on the outer circumference side to the extent of nearly becoming a position contacting with the external wall surface 32. A joining part of the cylinder-shaped external wall surface 32 and the outer edge part of the rear wall surface 31 is formed to the shape of curved surface (the part seen to be ring-shaped in the front view of the arrow 32*a*), and the branching passages 35*a* through 35*d* are located in the positions interfering with this curved-surface shaped part. By arranging the branching passages 35*a* through 35*d* in the outmost circumference part in the inner side part of the rear wall surface 31 in this way, the cooling air, which moves along the inner surface of the external wall surface 32 after moving in the radial direction of the fan 25 and contacting with the inner surface of the external wall surface 32, is easily guided to the space on the motor 6 side, and when the air pressure applied to the outmost circumference part (the part of arrow 32*a*) when the speed of the motor 6 increases and the rotation speed of the fan 25 increases rises above a predetermined value, a portion of the cooling air can be discharged into the space (the inner space of the motor housing 2) on the motor 6 side with particularly excellent efficiency.

Figure 5:
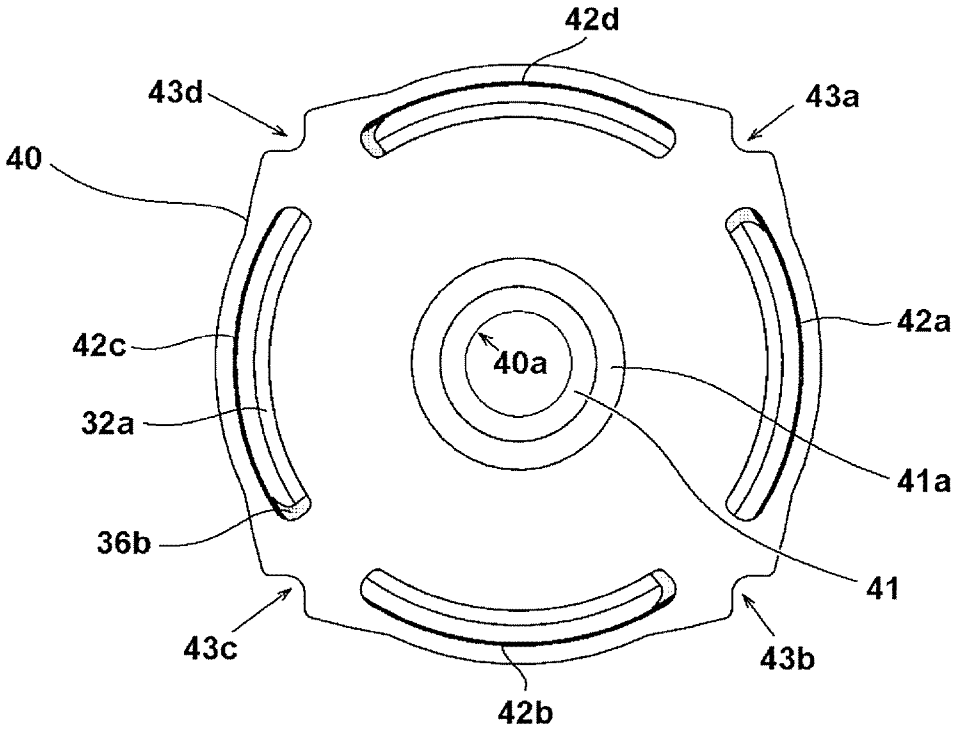
FIG. 5 is a front view of the assembly of the fan guide 30 and the bearing holder 40 in FIG. 2.

FIG. 5 is a front view of the assembly of the fan guide 30 and the bearing holder 40. In the bearing holder 40, a through hole 40*a* that allows the rotation axis 10 of the motor 6 to pass therethrough and exhaust holes 42*a* through 42*d* for the cooling air are formed. The bearing holder 40 functions as a cover component covering the opening part of the cup-shaped fan guide 30. The bearing holder 40 is formed by a metallic plate which becomes a wall surface perpendicular to the axis direction of the motor 6, and forms a cylindrical part 41 by performing rising processing, that is, by performing the so-called burring processing around the through hole 40*a*. On the outer circumference side of the cylindrical part 41, a ring-shaped step part 41*a* slightly protruding toward the front side is formed. The step part 41*a* is formed to make it easier to perform the burring processing, and is formed to define a contacting surface which successfully contacts with the outer ring of the bearing 18 (see FIG. 1).

In the part near the outer circumference of the bearing holder 40, four exhaust holes 42*a* through 42*d* which extend in the circumferential direction in an elongated shape are formed. Through these exhaust holes 42*a* through 42*d*, most of the cooling air drawn by the fan 25 is discharged to the gear case 3 side from the fan chamber (a space where the fan 25 is accommodated), and is discharged outside from the exhaust port formed in the gear case 3. In FIG. 5, a state in which a part of the structure shown in FIG. 4 (the external wall surface 32 and the rear slant surfaces 36*a* through 36*d* in FIG. 4) can be seen from the exhaust holes 42*a* through 42*d* is illustrated.

Figure 6:
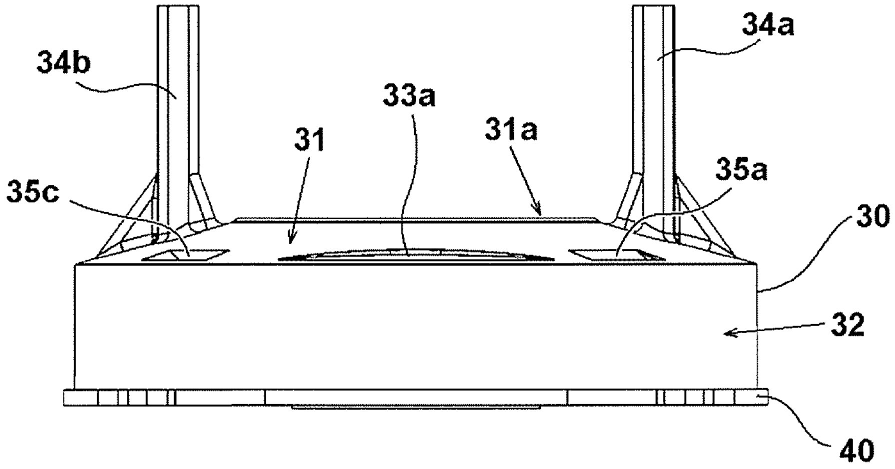
FIG. 6 is a side view of the assembly of the fan guide 30 and the bearing holder 40 in FIG. 2.

FIG. 6 is a side view of the fan guide 30 and the bearing holder 40. In this embodiment, the whole of the fan 25 is covered by the fan guide 30 and the bearing holder 40. That is, the rear surface, front surface and outer circumference surface of the fan 25 are covered, but the external wall surface 32 covering the outer circumference part of the fan 25 may also be integrally arranged with the bearing holder 40 side instead of being arranged on the fan guide 30 side. Besides, the external wall surface 32 covering the outer circumference part of the fan 25 may also be formed using the inner wall surface of the motor housing 2. The critical point is that the fan chamber in which air flow is generated by the fan 25 is formed, the ventilation hole 31*a* which becomes the inlet of the air and the exhaust holes 42*a* through 42*d* which become the outlet of the air and are connected to the exhaust port 3*b* side of the gear case 3 are arranged in the fan chamber, and a third air passage (the branching passages 35*a* through 35*d*) is arranged to circulate a portion of the air of the fan chamber to the ventilation side (the upstream side of the air). That is, not all the air generated by the fan 25 is discharged, and a portion of it returns to the flow channel before entering the fan chamber. The total air volume flowing from the branching passages 35*a* through 35*d* is preferably below 20% of the total air volume flowing from the exhaust holes 42*a* through 42*d* at a speed close to the highest speed of the motor 6 during idling, and the noise caused by excessive turbulent flow can be suppressed.

Figure 7:
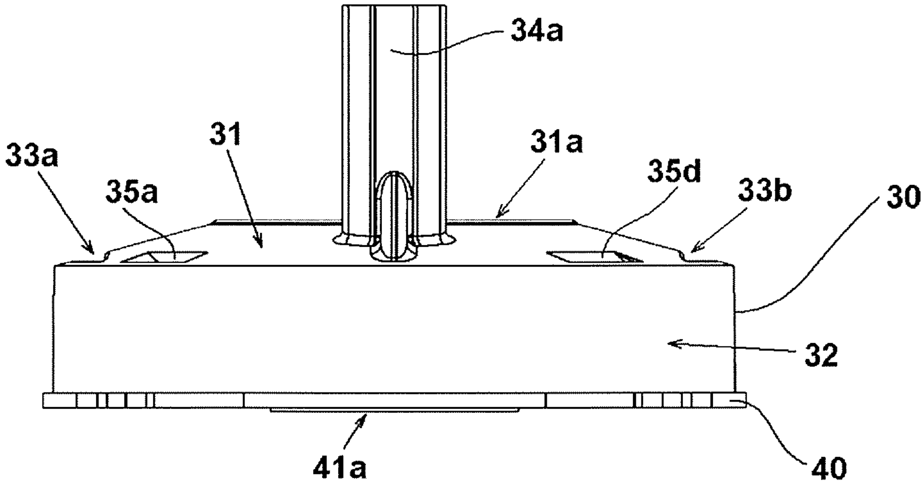
FIG. 7 is a side view of the assembly of the fan guide 30 and the bearing holder 40 in FIG. 2 seen from another lateral surface.

FIG. 7 is a side view of the fan guide 30 and the bearing holder 40 from another lateral surface. In two positions on the outer circumference part of the rear wall surface 31 of the fan guide 30, dents 33*a*, 33*b* for baffling the fan guide 30 with respect to the motor housing 2 are formed. Though it is not shown in this specification, near the opening 2*a* (see FIG. 1) of the motor housing 2, a step part engaging with the dents 33*a*, 33*b* which is straight-line shaped in the circumferential direction is formed, and when the gear case 3 is fixed to the motor housing 2, the dents 33*a*, 33*b* of the fan guide 30 engage with the step part of the motor housing 2, thereby the fan guide 30 is fixed so as not to rotate in the rotation direction. In this case, because the stator pressers 34*a*, 34*b* are formed in the fan guide 30, the movement of the motor 6 in the axis direction is stopped, and the function as a baffling component in the rotation direction is realized.

Figure 8:
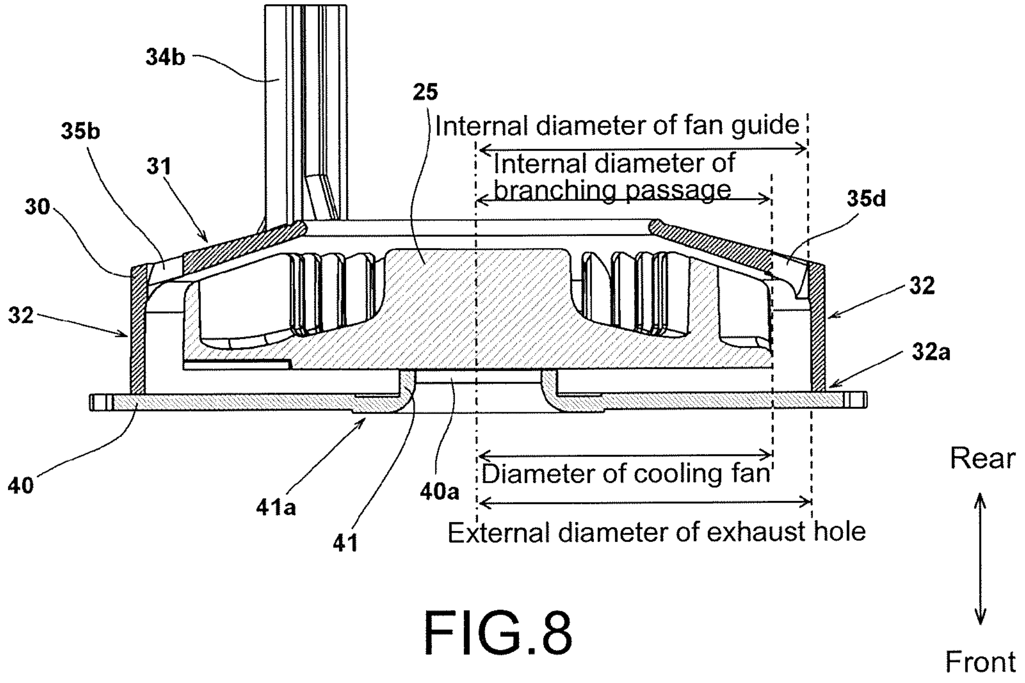
FIG. 8 is a cross-section view of an A-A part in FIG. 3.
Figure 9:
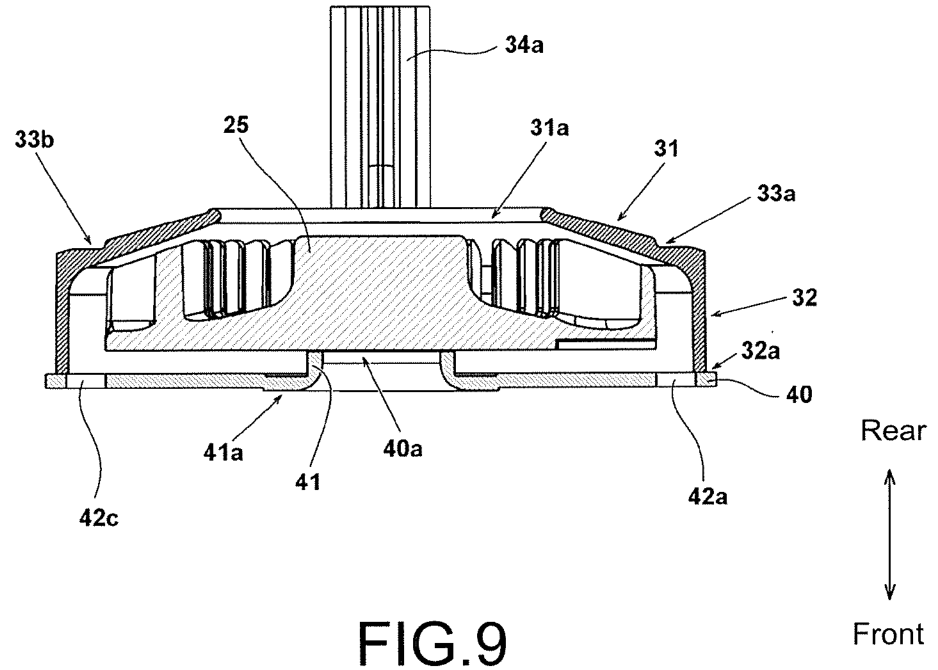
FIG. 9 is a cross-section view of a B-B part in FIG. 3.

FIG. 8 is a cross-section view of an A-A part in FIG. 3, and FIG. 9 is a B-B cross-section view which is the cross section of other part in FIG. 3. Here, the fan guide 30 with a plurality of holes (the branching passages 35*a* through 35*d*) is arranged on the rear side of the fan 25. The internal diameter of the branching passages 35*a* through 35*d* is larger than the diameter (external diameter) of the fan 25. Besides, the external diameter of the branching passages 35*a* through 35*d* is equal to the internal diameter of the fan guide 30. In the central part of the bearing holder 40, a cylinder-shaped part (the cylindrical part 41) is formed so as to protrude from the front side toward the rear side. On the outer circumference side of the cylindrical part 41, a part pressed to a ring shape (the step part 41*a*) is formed slightly forward, and the outer circumference side becomes a flat surface part 41*b*. Exhaust holes 42*a*, 42*c* are arranged near the outer edge of the flat surface part 41*b*. It is preferable that the positions of the outer edge sections of the exhaust holes 42*a* through 42*d* approximately correspond to the internal diameter of the opening part 32*a* of the cylinder-shaped external wall surface 32.

Figure 10:
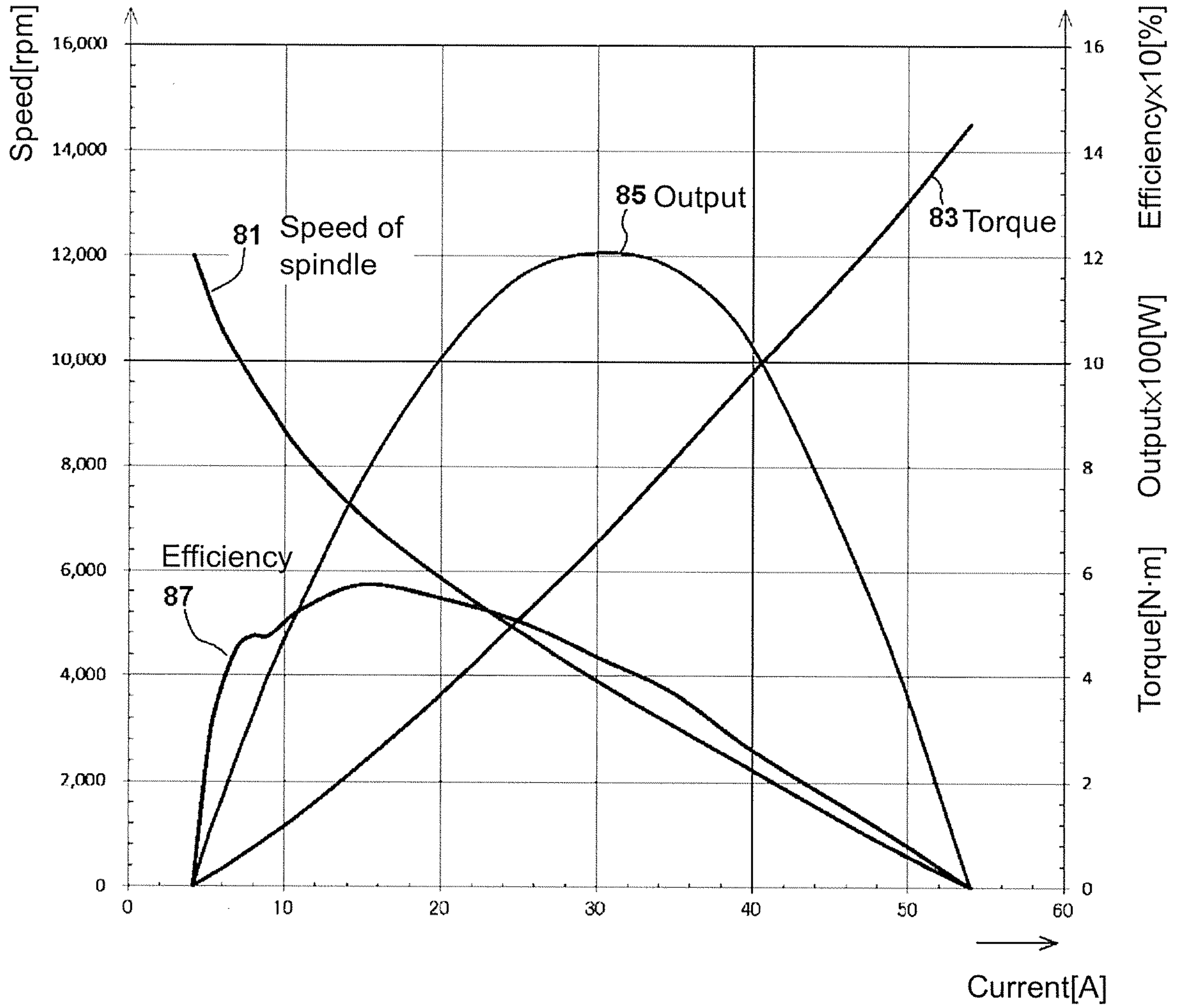
FIG. 10 is a diagram for describing the property of a motor in FIG. 1.

FIG. 10 is a diagram for describing the motor property of the disk grinder 1 of this embodiment. In FIG. 10, the horizontal axis stands for a current flowing in the motor 6 (unit [A]), and the vertical axis on the left stands for the speed of the spindle 11 (unit [rpm]). Here, the speed of the motor 6 is decelerated by a decelerating mechanism comprising two bevel gears 21, 22 to a ⅓ speed and is transmitted to the spindle 11. Therefore, three times of the speed of the spindle 11 is the speed of the motor 6. The vertical axis on the right stands for the output torque (unit [N·m] of the spindle 11, the output (unit 100×[W]) of the spindle 11, and the efficiency (unit 10×[%]). A speed 81 of the spindle 11 is about 12,000 rpm at most during idling state; when the load increases in the grinding operation done by the grinding stone 5, the speed 81 of the spindle 11 decreases, and the current flowing in the motor 6 and a torque 83 increase accordingly. The curve of an efficiency 87 gets to a peak near the point where the current value is about 15 A. Then, in a state just before the motor 6 stops because of maximum load, a motor current of about 54 A flows in the motor 6. The output 85 of the spindle 11 at this moment is an inverted parabolic curve with a maximum value near the point where the motor current is about 30 A. The torque 83 at this moment is approximately opposite to the speed 81 of the spindle 11, wherein the torque 83 is 0 near the highest speed and becomes a maximum near the lowest speed.

Figure 11:
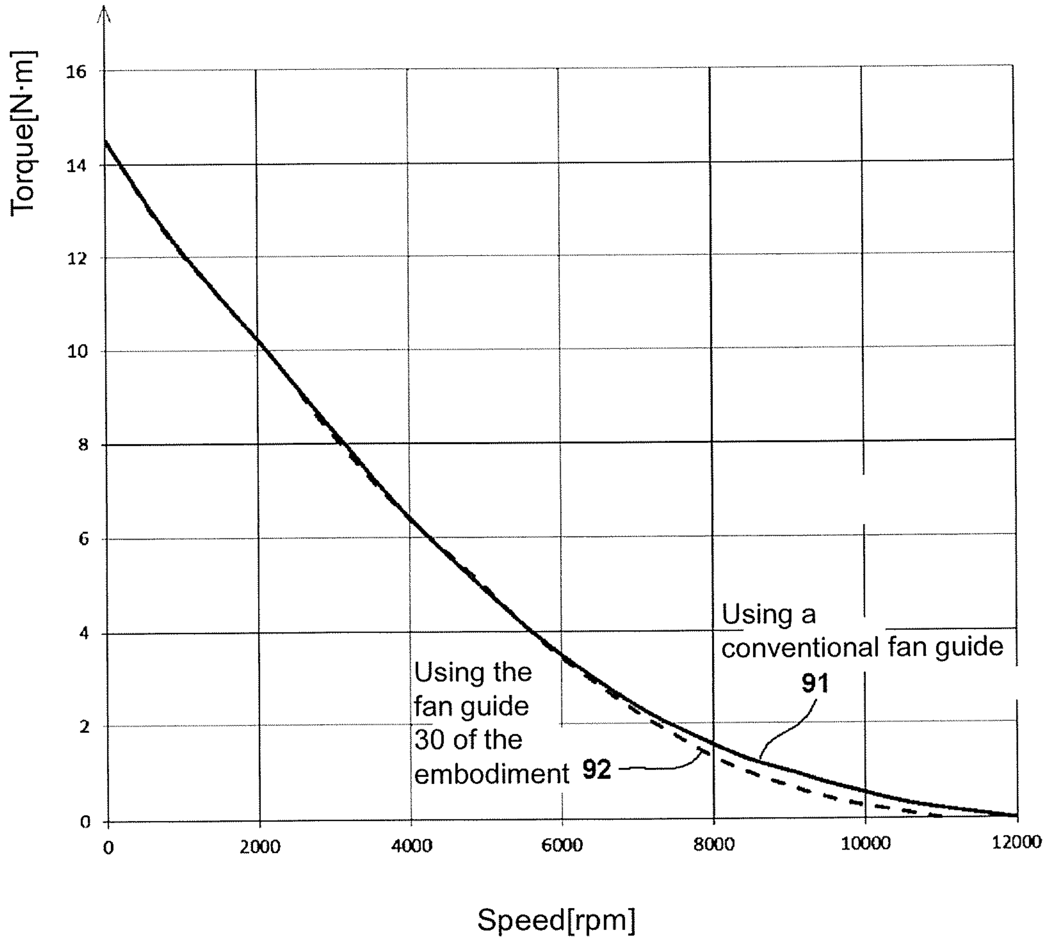
FIG. 11 is a diagram for describing a relationship between the speed and the torque of a motor 6 in FIG. 1.

FIG. 11 is a diagram for describing the relationship between the speed and torque of the motor 6. Here, the horizontal axis stands for the speed of the spindle 11 (unit [rpm]), and the vertical axis stands for the torque (unit [N·m]). A curve 91 shown by a solid line stands for the relationship of the speed and torque of a standard fan guide. Here, the standard fan guide is a fan guide without the branching passages 35*a* through 35*d* of the fan guide 30 shown in FIG. 2 through FIG. 9 and the corresponding part is completely filled. The shape of the bearing holder 40 arranged in front of the standard fan guide is the same as in this embodiment. In the case of this standard fan guide, the air flowing into the interior of the fan guide from the motor 6 side inside the inner space of the motor housing 2 is discharged completely from the exhaust holes 42*a* through 42*d* of the bearing holder 40 to the gear case 3 side. Accordingly, when the fan 25 rotates at a high speed, the flow of the cooling air is not turbulent, so the output loss is small, and the highest speed of the spindle 11 during idling is up to about 12,000 rpm, leading to a loud noise of the fan. Besides, in a disk grinder, the upper limit of the speed of the spindle 11 is defined according to the highest permissible speed or a restriction on standard of the grinding stone 5. Therefore, it is preferable that the highest speed during idling does not increase too much.

In a case when the fan guide 30 of this embodiment is used, as shown by curve 92 represented by a dotted line, a portion of the cooling air circulates inside the motor housing 2 so as to return to the motor 6 side from the interior of the fan guide 30 via the branching passages 35*a* through 35*d*. Due to the circulation (turbulent flow) of the cooling air, compared with a conventional fan guide, the load to the motor 6 in a high-speed region increases because of the increase in the loss resistance of the fan 25. Therefore, when the speed of the fan 25 is about 6,000 rpm (the actual operation region), the torque can be realized with a value comparable to a conventional value, and the highest speed of the spindle 11 during idling can be reduced to about 11,000 rpm, which is about 10% lower than the conventional value. Accordingly, in this embodiment, by arranging a turbulent flow generating means (the branching passages 35*a* through 35*d*) so as to disturb the flow of the cooling air of the fan guide 30 to increase resistance of the fan, even if the motor 6 is not electrically controlled, high-speed rotation of the motor 6 during idling can be suppressed. As a result, when the output of the motor 6 is increased than in a conventional situation and the output torque of the power tool is increased, particularly excellent result is obtained. Besides, because the speed during idling can be lowered, the exhaust amount decreases and the noise is suppressed, and by changing the specification of the fan 25 to increase the ventilation volume (increases fan loss), the exhaust amount is the same as in a conventional situation while the speed during idling can be further decreased. The load applied by the fan 25 to the motor 6 at this moment is proportional to the square of the speed of the motor 6, so that even the workload of the fan 25 increases, there is little influence caused by the fan loss in the actual operation region (close to 6,000 rpm). Moreover, in the structure of this embodiment, a control device electrically controlling the motor 6 is not necessary, and the structure is also simple, therefore a power tool with low risk of failure and high reliability can be realized.

In the above, in this embodiment, the fan guide 30 for introducing the air of the fan 25 is arranged, in the fan guide 30, the ventilation hole 31*a* for passing the air flowing into the fan 25 and the branching passages 35*a* through 35*d* for diverging a portion of the cooling air are arranged, and a portion of the cooling air circulates inside the motor housing 2 due to the branching passages 35*a* through 35*d*. When adjusting the amount of the circulating air, all that needs to do is to redo the fan guide 30 which is a molded article of synthetic resin to change the size, numbers, interval and positions in the radial direction of the branching passages 35*a* through 35*d*, the shapes of the rear slant surface 36*a* through 36*d* and the slant surface 37*a* through 37*d* and so on, therefore a desired circulating state can be easily realized.

Embodiment 2

Figure 12:
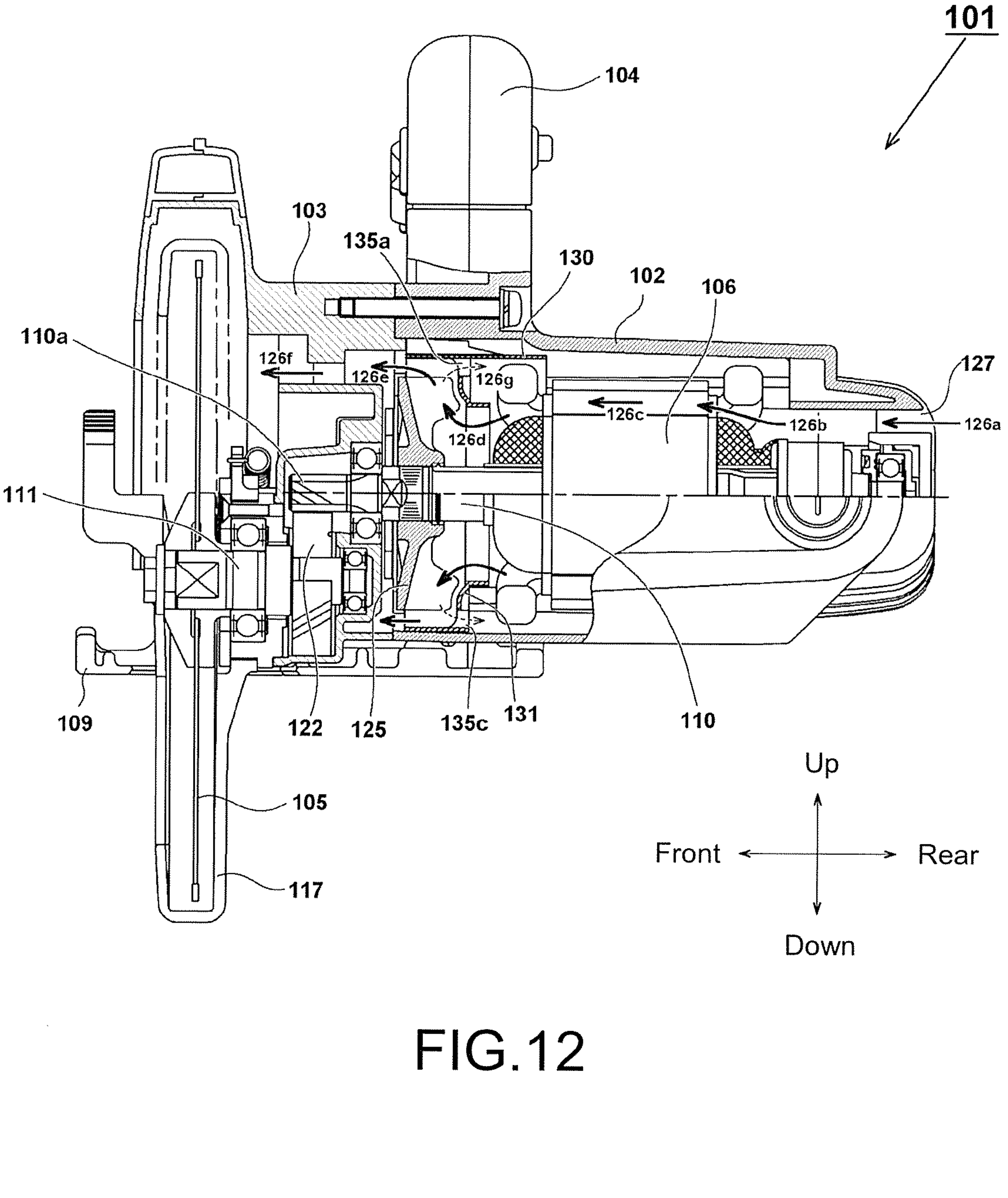
FIG. 12 is a cross-section view showing an electric circular saw 101 of a second embodiment of the present invention.

Next, FIG. 12 is used to describe a second embodiment of the present invention. In the second embodiment, a fan guide 130 having branching passages is applied to an electric circular saw 101. The electric circular saw 101 is an electric power tool comprising: a motor housing 102 made of synthetic resin, which accommodates a motor 106; a handle 104 for the operator to grip; a saw blade 105, which cuts the material to be cut; and a base 109, which abuts against the material to be cut. The rotation driving force of the motor 106 is transmitted to a spindle 111 using a power transmission mechanism, and the circular saw blade 105 mounted on the spindle 111 rotates at a high speed. A rotation axis 110 passes through a fan 125 and extends forward, and a pinion 110*a* is formed at a front end. The pinion 110*a* engages with a spur gear 122 fixed at a rear end of the spindle 111. Here, the pinion 110*a* and the spur gear 122 form a decelerating mechanism, the speed of the motor 6 is decelerated with a predetermined decelerating ratio and the spindle 111 rotates.

About half of the saw blade 105 on the upper side is covered by a gear cover 103, and a part of the saw blade 105 protruding downward from the base 109 is covered by a safety cover 117. The safety cover 117 is arranged to be capable of revolving coaxially with the spindle 111, and abuts against the material to be cut and revolves when the base 109 is abutted against the material to be cut and the saw blade 105 is slid in the cutting direction. The operator grips the handle 104 and turns on a switch that is not shown, by which the rotation of the motor 106 is transmits to the saw blade 105 via a decelerating device and the material to be cut can be cut.

The fan guide 130 is arranged between the fan 125 and the motor 106. In the fan guide, a substantially cylinder-shaped rear wall surface 131 for guiding the air drawn to the internal side of an outer circumference part is formed. In several positions (four positions located up, down, left and right) of the outer circumference part of the rear wall surface 131, branching passages 135*a*, 135*c* are arranged (the other two branching passages cannot be seen in FIG. 12). A ventilation hole 127 is arranged on the rear side of the motor housing 102. The fan 125 rotates synchronously with the rotation axis 110 of the motor 106, and the air drawn from the ventilation hole 127 by this rotation (arrow 126*a*) flows around the motor as shown by arrows 126*b* through 126*c*, flows as shown by arrows 126*d* to 126*e* and flows to the gear cover 103 side as shown by an arrow 126*f*. Here, because the branching passages 135*a*, 135*c* and so on are arranged on the fan guide 130, a portion of the air drawn by the fan 125 diverges on the motor 106 side and flows as shown by a dotted-line arrow 126*g*. The air of the dotted-line arrow 126*g* joins with the arrow 126*d* flowing in and circulates in the interior of the motor housing 102. The positions where the branching passages are arranged (the circumferential direction position, the radial direction position, and the direction of the passage) and so on may be the same as in the first embodiment, as long as the objective of increasing the rotation resistance of the fan 125 by the effect of the diverged air and slightly increasing the load of the motor 106 during high speed rotation can be achieved, the arrangement location or shape can be optional.

According to the second embodiment, by forming branching passages in the air path of the cooling air and circulating a portion of the cooling air from the rotation space (fan chamber) of the fan 125 to the motor 106 side, an increase in the speed of the motor 106 during idling can be suppressed using the force of the air generated by the fan 125. As a result, even if the output of the motor is further increased than before, the speed of the saw blade 105 can be maintained within a predetermined range. Moreover, similar to the first embodiment, in the structure of this embodiment, a control device electrically controlling the motor 106 is not necessary either, and the structure is also simple, therefore a power tool with low risk of failure and high reliability can be realized.

In the above, the present invention is described based on the embodiment, but the present invention is not limited to the embodiment and can be modified without departing from the spirit. For example, in the abovementioned embodiment, an electric power tool using a disk grinder and an electric circular saw is descried as an example of the power tool, but it is not limited to this; as long as it is configured so that a fan for cooling or other usages is arranged in the rotation axis of the motor, and the air is taken into the interior of the housing from the outside of the housing, the present invention can be realized in any power tool. Besides, in the abovementioned embodiment, it is configured so as to mount the fan guide on the motor housing, but the housing and the fan guide may also be formed as an integrally molded article. Furthermore, it may also be configured so that the air diverged using the fan guide not only circulates on the motor side but also flows to other positions and increases the resistance of the fan.

What is claimed is:

1. A power tool, comprising:

a motor;

a fan, which is rotated by the motor;

a housing, which accommodates the motor and the fan; and a fan guide, which straightens a cooling air generated by the fan, wherein ventilation ports introducing an external air and exhaust ports discharging an internal air are arranged on the housing, and an air path of the cooling air is formed from the ventilation ports to the exhaust ports by the rotation of the fan, wherein the fan guide comprises ventilation holes for passing the air flowing into the fan, branching passages for diverging a portion of the cooling air of the fan and a motor side wall surface at a side of the fan guide facing to the motor, and a portion of the cooling air returns to an air path before entering the fan guide owing to the branching passages, wherein the fan guide further comprises through holes forming the branching passages, wherein the ventilation holes are arranged near the center of the motor side wall surface, and the through holes are arranged on an outer circumference side of the ventilation holes in the motor side wall surface.

2. The power tool according to claim 1, wherein a portion of the cooling air is guided by the fan guide, and the housing and the fan guide are separate members.

3. The power tool according to claim 2, wherein the exhaust port side of the fan guide is covered by a cover component having exhaust holes.

4. The power tool according to claim 3, wherein a total opening area of the through holes is smaller than a total opening area of the exhaust holes.

5. The power tool according to claim 4, wherein a power transmission mechanism is arranged on a front end of a rotation axis of the motor, the fan is fixed to the rotation axis in a position between a stator of the motor and the power transmission mechanism, the fan guide is arranged between the fan and the stator of the motor, the motor side wall surface is perpendicular to an axis direction, the cover component comprises a wall surface perpendicular to the axis direction and is arranged between the fan and the power transmission mechanism.

6. The power tool according to claim 5, wherein the fan is a centrifugal fan rotating between the motor side wall surface and the cover component, the fan guide is integrally molded so as to be disposed to extend from an outer edge part of the motor side wall surface toward the cover component and cover an outer circumference side of the centrifugal fan, and the through holes are arranged in a circumferential direction in a plurality of positions of the outer circumference side of the motor side wall surface with a distance between each other.

7. The power tool according to claim 6, wherein the through holes guide the cooling air toward a spinning direction of the motor and discharge the cooling air to the air path before entering the fan guide.

8. The power tool according to claim 7, wherein an air volume flowing out from the through holes is below 20% of the air volume flowing out from the exhaust holes.

9. The power tool according to claim 4, wherein the through holes guide the cooling air toward a spinning direction of the motor and discharge the cooling air to the air path before entering the fan guide.

10. The power tool according to claim 9, wherein an air volume flowing out from the through holes is below 20% of the air volume flowing out from the exhaust holes.

11. The power tool according to claim 5, wherein the through holes guide the cooling air toward a spinning direction of the motor and discharge the cooling air to the air path before entering the fan guide.

12. The power tool according to claim 11, wherein an air volume flowing out from the through holes is below 20% of the air volume flowing out from the exhaust holes.

13. A power tool without a controller that adjusts a rotation speed of a motor, comprising:

the motor;

a fan, which is rotated by the motor;

a housing, which accommodates the motor and the fan; and a fan guide, which straightens a cooling air generated by the fan, wherein ventilation ports introducing an external air and exhaust ports discharging an internal air are arranged on the housing, and an air path of the cooling air is formed from the ventilation ports to the exhaust ports by the rotation of the fan, wherein the fan guide comprises ventilation holes for passing the air flowing into the fan, branching passages for diverging a portion of the cooling air of the fan and a motor side wall surface at a side of the fan guide facing to the motor, and a portion of the cooling air returns to an air path before entering the fan guide owing to the branching passages, wherein the fan guide further comprises through holes forming the branching passages, wherein the ventilation holes are arranged near the center of the motor side wall surface, and the through holes are arranged on an outer circumference side of the ventilation holes in the motor side wall surface.

14. A power tool, comprising:

a motor;

a fan, which is rotated by the motor;

a housing, which accommodates the motor and the fan; and a fan guide, which straightens a cooling air generated by the fan, wherein ventilation ports introducing an external air and exhaust ports discharging an internal air are arranged on the housing, and an air path of the cooling air is formed from the ventilation ports to the exhaust ports by the rotation of the fan, wherein the fan guide comprises ventilation holes for passing the air flowing into the fan and branching passages for diverging a portion of the cooling air of the fan, and a portion of the cooling air returns to an air path before entering the fan guide owing to the branching passages, wherein the fan guide further comprises through holes forming the branching passages, wherein the through holes guide the cooling air toward a spinning direction of the motor and discharge the cooling air to the air path before entering the fan guide.

* * * * *